No. 880,450. PATENTED FEB. 25, 1908.
M. P. HENVIS.
STEERING GEAR AND AXLE FOR AUTOMOBILES.
APPLICATION FILED OCT. 11, 1907.
2 SHEETS—SHEET 1.
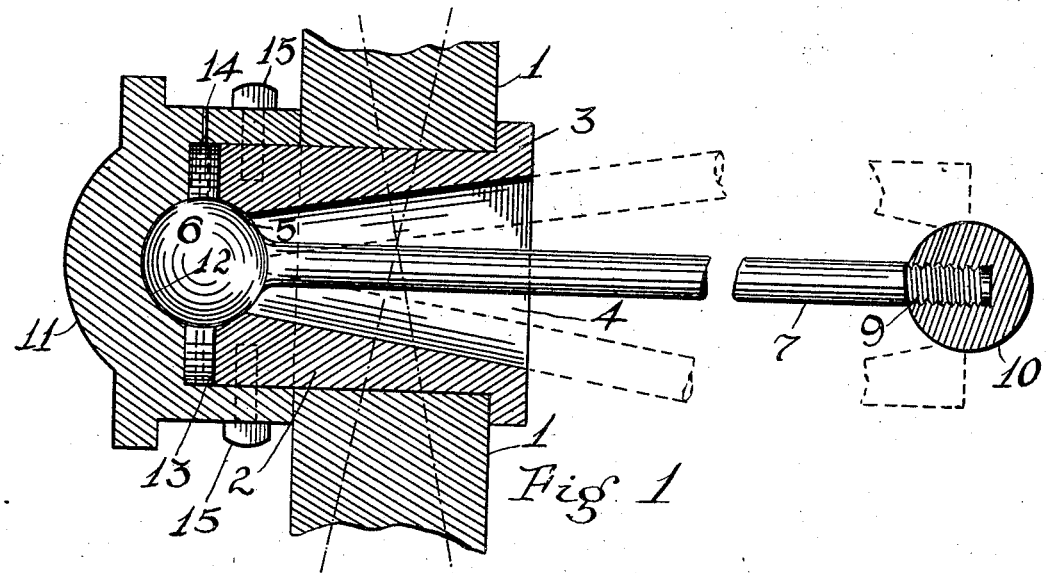
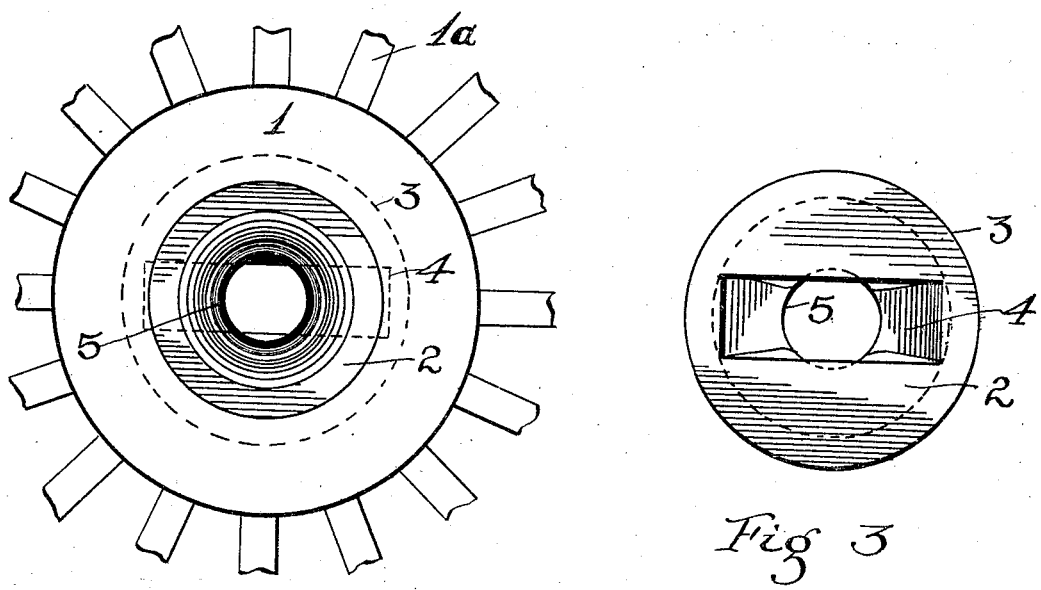
Maurice P. Henvis, Inventor.

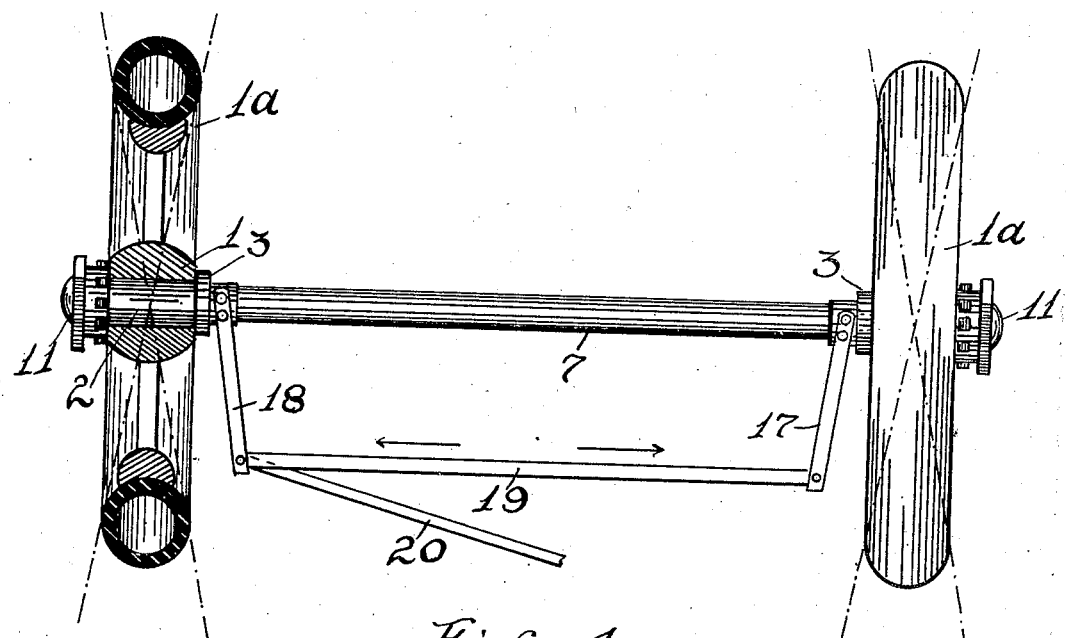
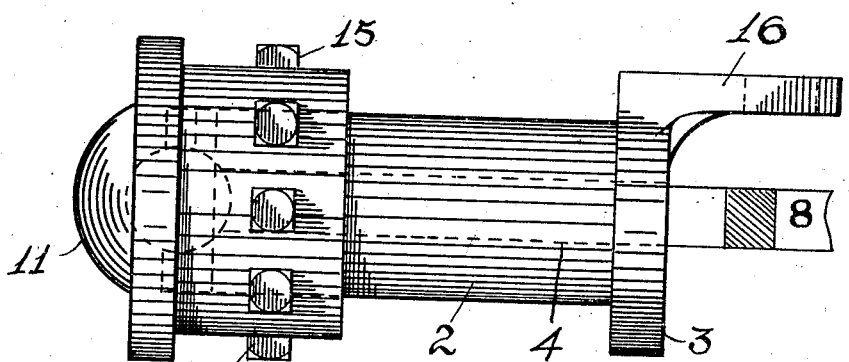

UNITED STATES PATENT OFFICE.

MAURICE P. HENVIS, OF NORFOLK, VIRGINIA, ASSIGNOR OF ONE-HALF TO EPHRIAM BALL, OF NORFOLK, VIRGINIA.

STEERING-GEAR AND AXLE FOR AUTOMOBILES.

No. 880,450.  Specification of Letters Patent.  Patented Feb. 25, 1908.

Application filed October 11, 1907. Serial No. 396,966.

*To all whom it may concern:*

Be it known that I, MAURICE P. HENVIS, a citizen of the United States, residing at Norfolk, in the county of Norfolk and State of Virginia, have invented certain new and useful Improvements in Steering-Gear and Axles for Automobiles, of which the following is a specification.

My invention relates to automobile steering gears and axles.

The object of the invention is to provide a steering gear having no parts which are weaker than the front axle of the machine.

In the current practice the front cross bars or axle beam is provided with a bifurcated or yoked portion with a vertical sleeve attached to the wheel and working on a small steel pin ranging in size from one quarter to three eighths of an inch which receives the whole thrust and weight of the automobile or car. These pins become bent by a blow and soon break and when the machine is running at a high speed the result is disastrous.

Further objects and advantages will be more fully described herein and specifically pointed out in the claims recourse being had to the accompanying drawings forming a part of this specification in which:—

Figure 1 is a sectional plan of the devices pertinent to my invention. Fig. 2 is an elevation of the outside of the hub of the wheels with the nut removed from the sleeve. Fig. 3 is a view showing the inner end of the sleeve. Fig. 4 is a plan of the wheels and axles showing partly in plan and partly in section the salient parts of the device, and Fig. 5 is an elevation of the sleeve, nut and a part of the square axle bar.

In the drawings like reference numerals indicate similar parts in all the views:—

1 are the wheel hubs of the rubber tired wheels 1ª.

2 is a sleeve having a flanged portion 3 around it.

The hubs of the wheels turn upon the sleeve as in Fig. 1, the flange 3, and the hereinafter described nut keep the wheel in place and forms a side bearing therefor.

4 is a tapered or V shaped slot the opening or divergence of the slot being towards the longitudinal center line of the automobile.

5 is a circular opening but provided with an annular concavity adapted to fit a certain portion of the surface of the spherical enlargements or balls 6 on each end of the shaft or front axle bar 7.

In Figs. 1 and 4 I show a rounded axle bar while in Fig. 5 a square bar or axle 8 is shown the latter is to be preferred. In order to assemble the parts together a thread is cut on one end of the bar 7 or 8 for screwing thereon the other ball as at 10.

11 is a nut having a spherical cavity or recess 12 adapted to fit half of the surface of the ball.

13 is a space for oil, 14 being an oil hole (Fig. 1).

15 are screws for holding the nut or cap 11 upon the sleeve or hollow axle pin 2.

In practice the sleeve 2 has a bracket or lug 16 (Fig. 5) for attaching arms 17 or 18 which are in turn connected to a rod 19 joining the two.

20 is a rod leading to the steering wheel on the car.

The invention permits the wheels to be mounted on a swivel and compensates for any movement given by the wheels and allows the steering arrangement to have great strength and durability. As shown the square axle 8 permits the upper portion of the recess or slot 4 to bear against it, the balls so that all friction may be avoided but sleeve, therefor can be arranged for steel this I do not show in the drawings.

As the drawing plainly shows the invention further description is deemed unnecessary.

Having described my invention what I claim and desire to secure by Letters Patent is:—

1. A device of the class described comprising a sleeve adapted to mount the wheels for rotation outside of the hubs and ball bearing means for said sleeve adapted to angularly position said wheels.

2. A device of the class described comprising a front axle having spherical enlargements thereon extending beyond the hubs, a sleeve having a tapered recess, a nut, and means for swivel mounting the wheels outside of the hubs on said balls by the sleeve and nut.

3. A device of the class described comprising a fixed axle having ball ends extending outside of the hubs a sleeve adapted to mount the wheels having a tapered slot, said sleeve having a concavity for one half of the said balls, and a concave nut adapted to cover the other half of the balls.

4. A device of the class described comprising a axle bar having enlargements on the ends thereof, a taper slotted bushing or sleeve, a nut on the outside of the hubs said sleeve and nut adapted to inclose said enlargements, and means for altering the angle of said sleeve and nut on the enlargements.

5. A device of the class described comprising a wheel bearing sleeve or bushing having a rectangular and a circular opening, a ball ended square shaft or axle bar for mounting the sleeve bushing for oscillation and a recessed nut on one end of the bushing outside of the wheel adapted to partly cover said balls on the axle.

In testimony whereof I have hereunto affixed my signature in the presence of two witnesses.

MAURICE P. HENVIS.

Witnesses:
W. A. C. PETTIT,
WALTER B. BURROW.